United States Patent [19]

Jones et al.

[11] Patent Number: 4,855,849
[45] Date of Patent: Aug. 8, 1989

[54] DISK DRIVE MOTOR MOUNT

[75] Inventors: David E. Jones, Layton; David S. McMurtrey, West Point, both of Utah

[73] Assignee: Iomega Corporation, Roy, Utah

[21] Appl. No.: 186,780

[22] Filed: Apr. 25, 1988

Related U.S. Application Data

[63] Continuation of Ser. No. 854,342, Apr. 21, 1986, abandoned.

[51] Int. Cl.⁴ .............................................. G11B 25/04
[52] U.S. Cl. ...................................... 360/97.01; 310/71
[58] Field of Search ...................... 360/86, 97, 99, 133; 369/261, 270; 310/DIG. 6, 71

[56] References Cited

U.S. PATENT DOCUMENTS

| | | | |
|---|---|---|---|
| 4,216,512 | 8/1980 | Vidwans | 360/133 |
| 4,558,245 | 12/1985 | Glasauer et al. | 310/DIG. 6 X |
| 4,604,665 | 8/1986 | Müller et al. | 360/97 |
| 4,626,727 | 12/1986 | Janson | 310/156 |
| 4,633,110 | 12/1986 | Genco et al. | 310/71 |
| 4,651,241 | 3/1987 | von der Heide et al. | 360/97 |
| 4,677,510 | 6/1987 | Shoji et al. | 360/99 |

FOREIGN PATENT DOCUMENTS

| | | | |
|---|---|---|---|
| 3303433 | 8/1983 | Fed. Rep. of Germany | 360/97 |
| 57-208668 | 12/1982 | Japan | 360/97 |
| 2132807 | 7/1984 | United Kingdom | 360/97 |

Primary Examiner—John H. Wolff
Attorney, Agent, or Firm—Woodcock, Washburn, Kurtz, Mackiewicz & Norris

[57] ABSTRACT

Disclosed is a system and method for mounting disk drive motors. The motor spindle and the drive shaft are rotatably supported by the disk drive chassis. The drive shaft of the motor extends through the printed circuit board of the disk drive and into a central aperture in the motor stator. Between the motor stator and the printed circuit board is a stator-spacer which positions and aligns the stator. The stator is mechanically mounted and electronically connected to the printed circuit board by means of stator retaining pins. The rotor bell of the motor is coaxially mounted to the drive shaft and inductively disposed about the stator.

8 Claims, 6 Drawing Sheets

DISK DRIVE MOTOR MOUNT

This is a continuation of application Ser. No. 854,342, filed Apr. 21, 1986 now abandoned.

RELATED APPLICATIONS

This application is related by subject matter to the following commonly assigned co-pending applications, all of which are incorporated herein by reference: application Ser. Nos. 854,333, 854,419, 854,130, and 854,292, all filed Apr. 21, 1986.

BACKGROUND OF THE INVENTION

This invention relates to a mounting mechanism for disk drive motors and more particularly to a mounting mechanism for mechanically mounting and electrically connecting the motor stator of a disk drive motor to the printed circuit board of a disk drive.

A drive motor and its associated electrical systems constitute a major and important component of the record disk drive. The motor itself is generally comprised of three major elements: the stator, the rotor, and the spindle. The stator is generally cylindrical in shape and has disposed about its outer periphery stator windings. An electrical current supplied to the stator windings results in a magnetic field. The rotor holds field magnets which responds to the magnetic field and cause rotation of the rotor. The drive spindle is attached to the rotor and rotates the record disk used with the disk drive.

In many previous mounting apparatus, all three elements of the disk drive motor were supported by and mounted to a chassis within the disk drive. The electrical power and other electronic signals were supplied to the motor by relatively complex and expensive harnesses and cables. These harnesses and cables not only increase the cost of the motor mounting device, but also result in an inefficient and time consuming manufacturing process. For example, see U.S. Pat. Nos. 4,558,245 - Glasauer et al; 4,197,489 - Dunn et al; 4,115,715 - Müller.

In many applications it is both desirable and necessary to monitor both the speed of the disk drive motor and the angular position of the disk drive motor relative to the chassis which supports it. In many applications the speed of the motor is determined using Hall effect devices properly positioned with respect to commutator magnets attached to the rotor. See for example, U.S. Pat. No. 4,311,933 - Riggs et al. In other applications this information is obtained by including one or more unbranched conducting traces on a circuit board axially displaced with respect to the stator. See for example U.S. Pat. No. 4,488,076 - MaCleod. Other means for sensing rotor position are disclosed in U.S. Pat. No. 4,296,362 - Beasley. In each of the prior art applications disclosed above, the means for mounting the stator with respect to the drive shaft and the rotor is subject to long assembly times and high cost. In addition, the need to precisely mount the sensors associated with the motor in a disk drive has in the past also resulted in relatively high cost and time consuming assembly processes.

SUMMARY OF THE INVENTION

Accordingly, it is an object of the present invention to provide a disk drive motor mounting apparatus which eliminates the need for electrical cables running from the disk drive power source to the motor stator, and from the motor stator to the various motor control devices.

It is another object of this invention to provide a method for quickly and efficiently mounting a drive motor to the chassis of a disk drive.

In accordance with the objects of this invention, a spindle is rotatably supported by a disk drive chassis. A drive shaft, which coaxially engages the spindle for rotation thereby, extends through the printed circuit board of the disk drive and into the central aperture of the motor stator. The stator is mechanically mounted and electronically connected to the printed circuit board by means of stator retaining pins.

Since the rotor and the spindle of this invention are both supported by the disk drive chassis, the printed circuit board only supports the stator. Thus, the stator retaining pins serve the dual function of supplying mechanical support to the stator as well as electronically connecting the stator to the printed circuit board. In this way, the need for expensive electronic cables and harnesses is eliminated, and assembly of the disk drive motor is simplified and facilitated.

DESCRITION OF THE PREFERRED EMBODIMENT

Figure 1:
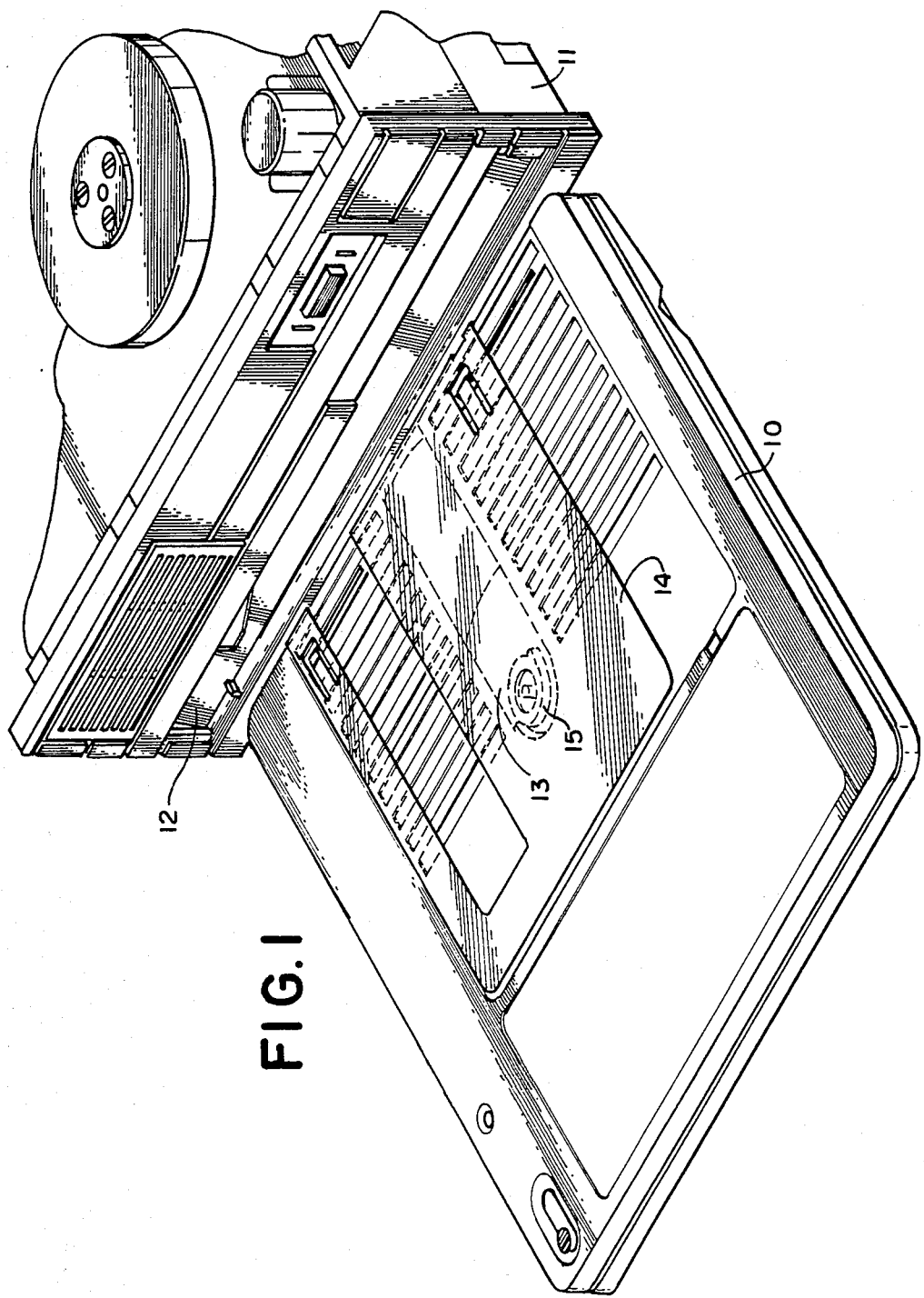
FIG. 1 is a cut away perspective view of a disk drive made according to this invention into which a cartridge made for use with the disk drive of the invention is about to be inserted.

Referring to FIG. 1, floppy disk cartridge 10 is shown in a top perspective view as it is about to enter disk drive chassis 11 through slot 12 in the front face of the disk drive chassis. Floppy disk 13 is enclosed by cartridge 10 and is revealed in phantom as indicated by the dashed lines. Cartridge cover 14 normally protects the floppy disk cartridge when not in use, but is displaced to the right upon insertion of the cartridge into the disk drive whereupon floppy disk hub 15 rotatably engages the drive spindle of this invention. Rotor-bell 16 provides rotational inertia to the drive spindle of this invention.

Figure 2:
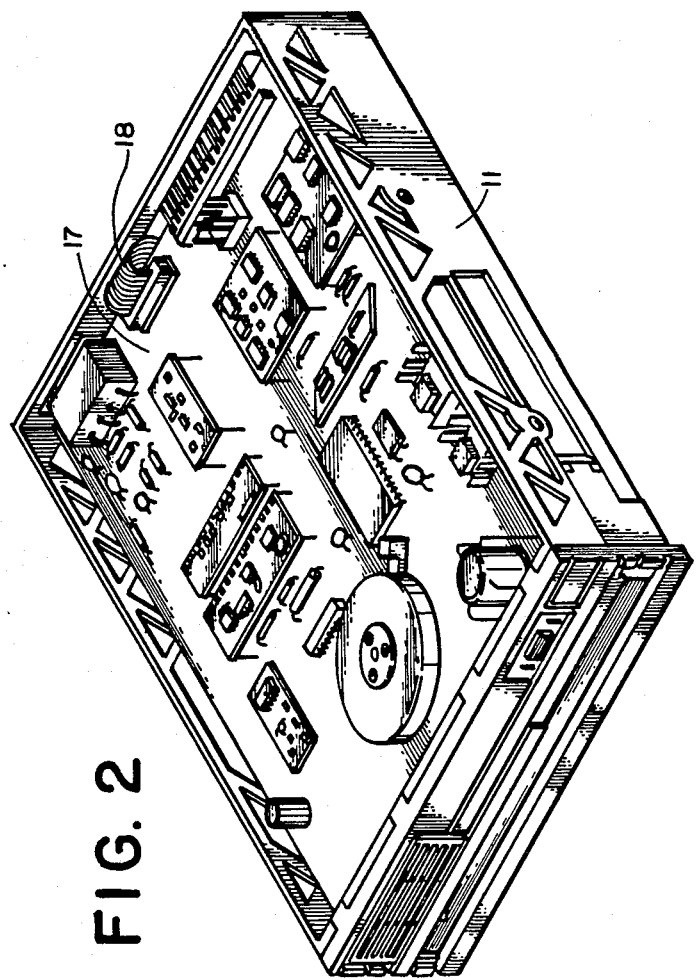
FIG. 2 is a perspective view from above showing a disk drive made according to this invention in which the top of the drive has been removed to reveal the printed circuit board and the top portion of the motor rotor.

Referring now to FIG. 2, a perspective view from above of disk drive chassis 11 is revealed. In this view, the top cover of chassis 11 has been removed to reveal the printed circuit board 17 contained within the chassis. During operation, electrical power is supplied to the printed circuit board through electrical harness 18. Various electrical components not necessarily related to the drive system of this invention are generally designated as 19 and are connected to the circuit printed on the under side of printed circuit board 17. The drive related electrical components of this invention are discussed later in the specification.

Figure 3:
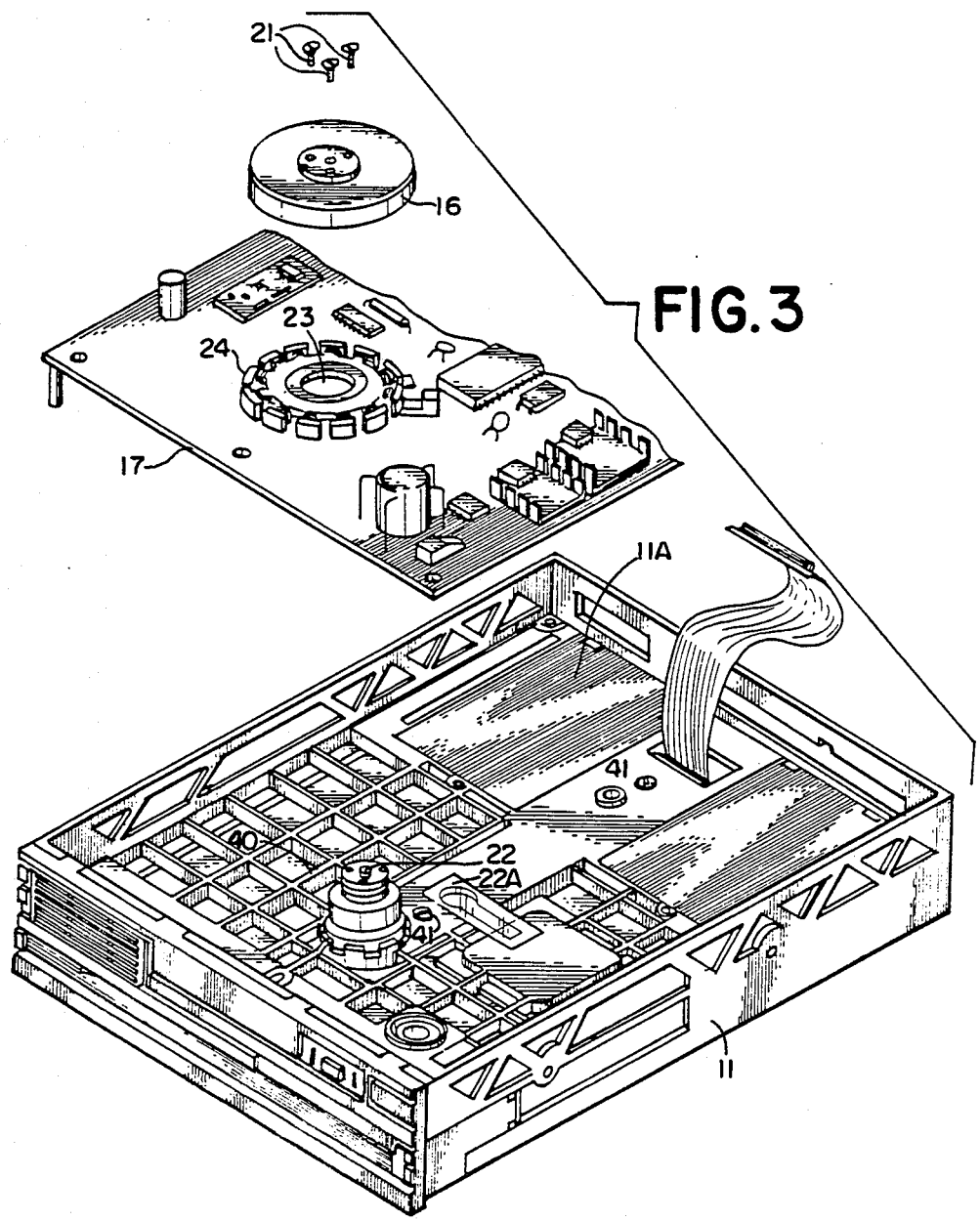
FIG. 3 is an exploded perspective view from above showing the motor rotor and the printed circuit board of this invention displaced from their normal mounted positions in the disk drive, thus revealing the lower portion of the drive shaft and drive spindle mounted to the disk drive chassis.
Figure 5:
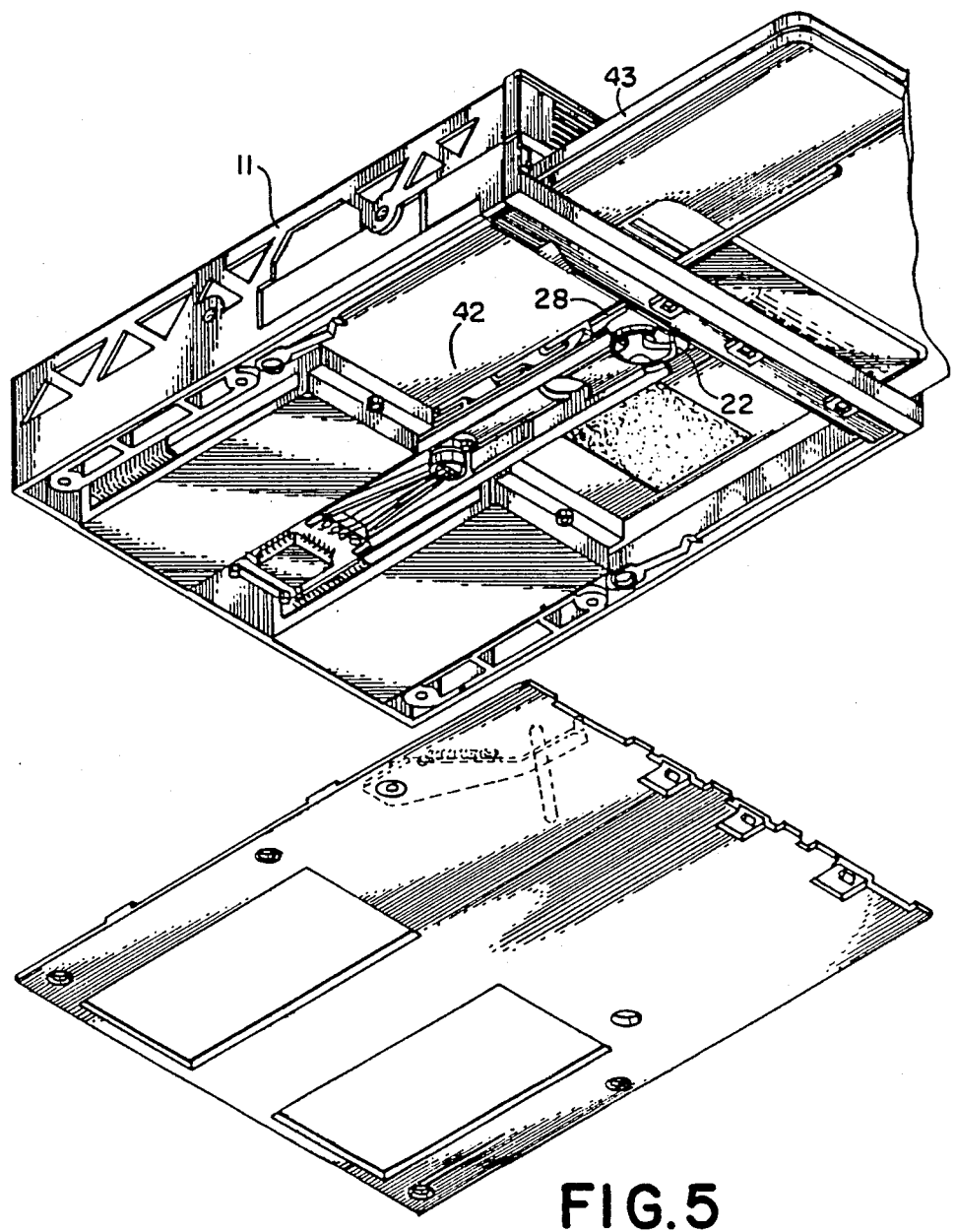
FIG. 5 is an exploded perspective view from below the disk drive made according to this invention showing the drive spindle and the spicule member to which it is mounted.

Rotor-bell 16 is mounted to the drive shaft of this invention by hold down screws 21. This is revealed in exploded perspective in FIG. 3 in which the hold down screws 21, rotor bell 16, and printed circuit board 17 have been displaced from their normal mounted positions to reveal the interior portion of drive chassis 11. In assembled form, hold down screws 21 mount rotor bell 16 to flange 40. Flange 40 is mounted to drive shaft 22, the lower portion of which is rotatably contained within drive shaft housing 22A. The drive shaft housing is an integral portion of the spicule member of this invention. The spicule member is more fully revealed in co-pending application bearing attorney's docket number IOM-8503. The major portion of the spicule member is contained below chassis bed 11A and is mounted thereto by screws 41. As best revealed in FIG. 5, the drive spindle 28 of this invention is rotatably mounted to spicule member 42 for rotation by drive shaft 22, the lower portion of which is attached to the drive spindle. More particularly, drive spindle 28 is contained within the lower portion of drive shaft housing 22A. As more fully revealed in co-pending application Serial No. 854,333 filed April 21, 1986, when a record disk cartridge 10 is inserted into the disk drive of this invention, the drive spindle 28 couples with the disk hub 15. Actuation of the drive motor herein described will then cause rotation of the disk 13.

Figure 4A:
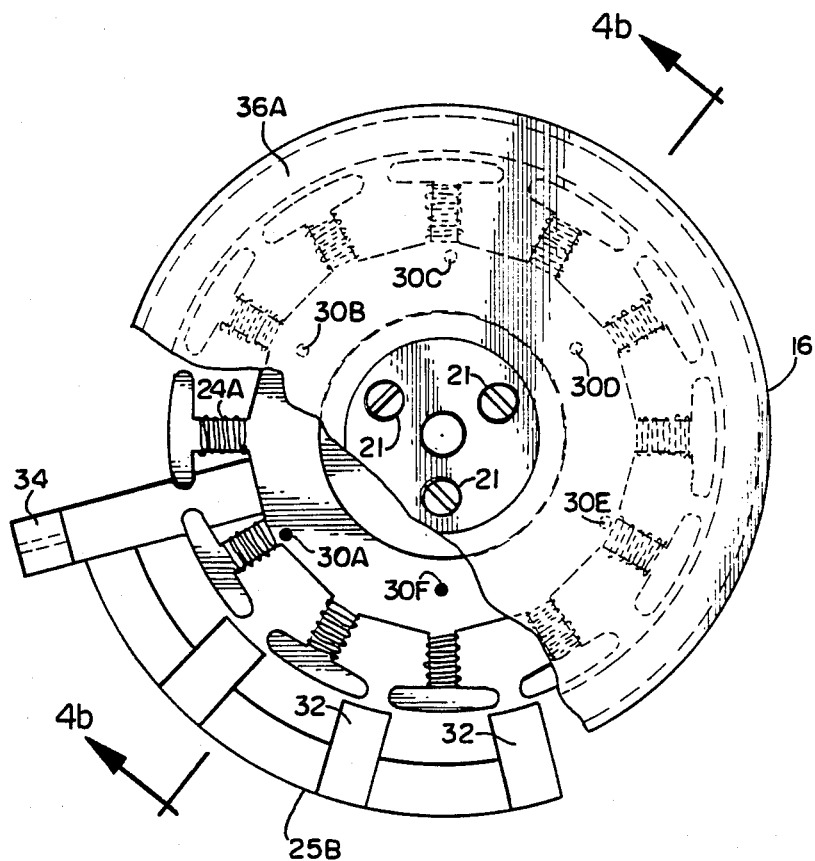
FIG. 4a is a cut away plan view from above showing the motor mounted to the disk drive according to this invention.
Figure 4B:
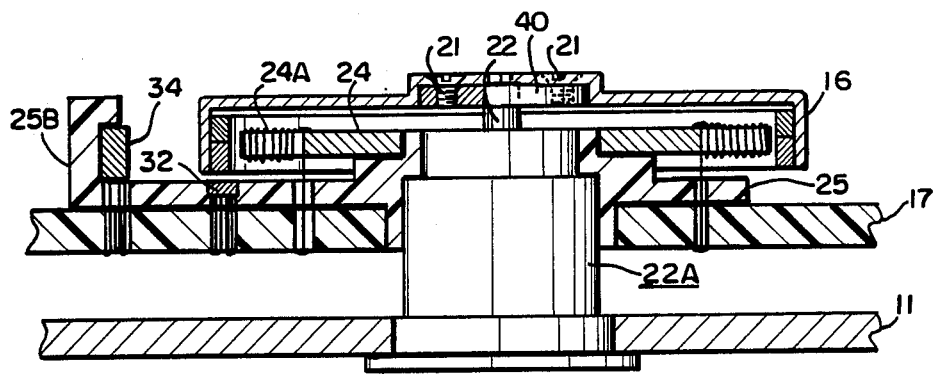
FIG. 4b is a cross sectional view showing the motor mounted to the disk drive according to this invention.
Figure 4C:
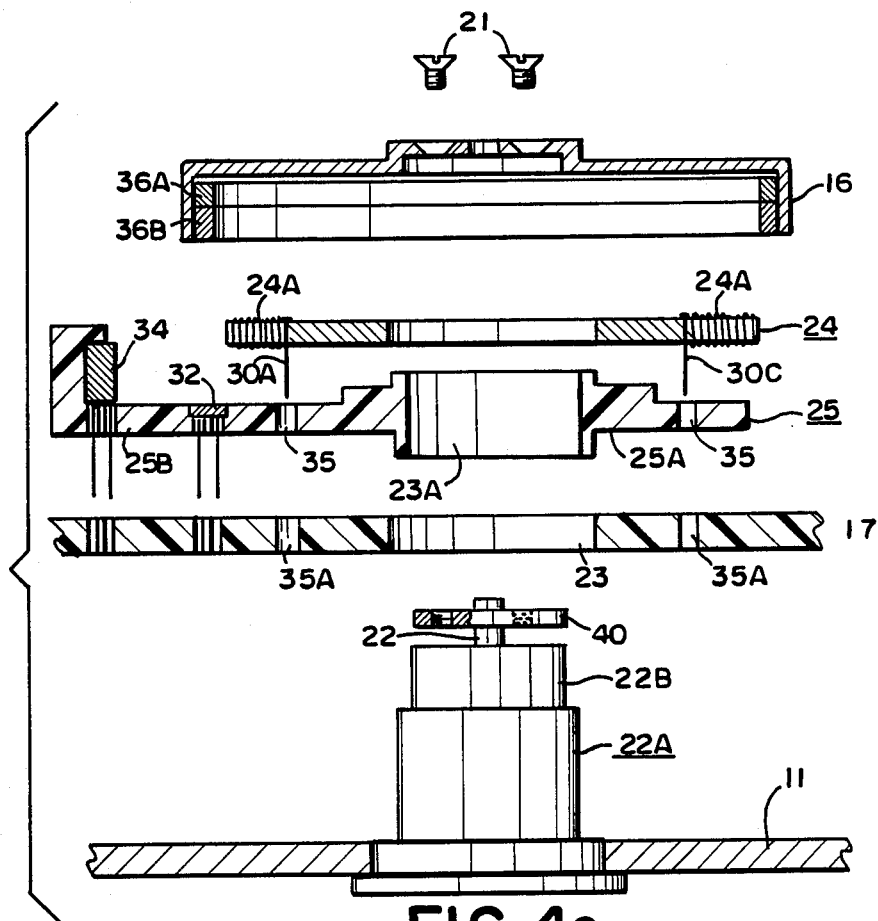
FIG. 4c is an exploded cross sectional view showing the motor of this invention displaced from its normal mounted position.

As most clearly revealed in FIGS. 4a, 4b and 4c, motor stator 24 is aligned with the printed circuit board of this invention by stator spacer 25. In assembled form, the printed circuit board 17 is mounted to drive chassis 11 according methods well known in the art. The structural relationship between the various components of the drive motor and printed circuit board of this invention are most clearly defined with reference to the preferred assembly method described below. It should be appreciated that the method described below is exemplary only and is intended only as illustrative of one of several possible assembly methods. Accordingly, assembly begins by rotatably mounting drive shaft 22 within drive shaft housing 22A by conventional means such as roller or ball bearings. Drive shaft 22 is mounted so as to rotatably engage drive spindle 28, which is also rotatably mounted within the drive shaft housing. As is best revealed in FIG. 4c, stator spacer 25 is then placed on the printed circuit board 17. The stator spacer serves to properly align the stator with the printed circuit board. It also serves as a mounting template for various components associated with the disk drive motor. Utilizing the stator spacer in this way allows the stator to be safely and efficiently supported by the printed circuit board. Use of the stator spacer also permits easy installation of the various electrical components which need to be precisely placed relative to rotor-bell 16 of the disk drive motor. In the preferred embodiment of this invention, stator spacer 25 is a molded plastic member having a generally cylindrical first portion 25A and a generally fan shaped second portion 25B extending radially therefrom. The lower section of cylindrical portion 25A is formed to loosely fit into aperture 23 in printed circuit board 17. The cylindrical portion 25A also contains a central cylindrical aperture 23A which is sized to provide sufficient clearance for the passage of drive shaft 22 therethrough. In the preferred embodiment, the upper portion of aperture 23A is beveled so as to guide drive shaft housing 22A to a substantially coaxial position therewith. Stator 24 is generally comprised of a metallic laminate material or other suitable material well known in the art, and is press-fit over the uppermost section of cylindrical portion 25A of stator-spacer 25. The outer periphery of stator 24 contains insulated stator windings 24A. Retaining pins 30A-30F (see FIG. 4a) pass through stator 24 and project out from the under side thereof. The term retaining pin as herein used describes any structural member having sufficient strength to firmly hold stator 24 to the printed circuit board while at the same time being comprised of a material generally conductive to the flow of electricity. For example, a copper pin formed into a U shape or having a staple type configuration would constitute a retaining pin as herein used. In the preferred embodiment of this invention, a retaining pin having the shape of a nail is used. The head or other portion of each of pins 30A, C, and E are in electrically conductive contact with stator windings 24A and are insulated from the remainder of stator 24. This electrically conductive contact can be maintained by any means well known in the art, such as soldering for example. Retaining pins 30B, 30D, and 30F also pass through stator 24 and project out from the under side thereof. These pins, however, are not in electrically conductive contact with stator windings 24A but are in electrically conductive contact with stator 24. In this configuration, retaining pins 30A, C, and E provide the electrical current to stator windings 24A, while retaining pins 30B, D and F serve as a ground for stator 24. When stator 24 is press fit over cylindrical portion 25A, retaining pins 30A, C and E pass through apertures 35 in the stator-spacer 25 and apertures 35A in the printed circuit board 17 and project slightly from the under side thereof. The pins 30A, C, and E should pass readily through both apertures 35. However, the clearance between pins 30A, C, and E and apertures 35A should be of sufficiently tight tolerance so as to align the stator with the printed circuit board 17. Pins 30B, D and F also pass through apertures (not shown) in stator spacer 25. However, these pins should pass through the stator with sufficiently tight tolerance so as to align and hold the stator 24 to the stator spacer. Pins 30B, D, and F also pass through printed circuit board 17 in the same manner as pins 30A, C and E. In this way, stator 24 is quickly and efficiently aligned with the printed circuit board of this invention by simply fitting the stator about the top of cylindrical portion 25A of stator-spacer 25. The fan shaped portion 25B contains receptacles which are located a precise distance from the outer diameter of cylindrical portion 25A. The location of these receptacles is determined in accordance with the accepted practice of those skilled in the art for placing sensing devices 32 so as to detect the rotation of rotor-bell 16. The term sensing device, as used herein, refers to any device capable of sensing, either directly or indirectly, the movement or position of rotor-bell 16. In a preferred embodiment of this invention, sensing device 32 is an electrical sensor containing three pins which pass through fan shaped portion 25B and printed circuit board 17 in a manner similar to retaining pins 30A, C, and E. In a more preferred embodiment of this invention, sensing device 32 comprises a Hall effect device. Sensing device 34 is then similarly mounted in a receptacle of fan shaped portion 25B so as to detect the angular position of rotor-bell 16 relative to the disk drive chassis.

At this stage of the assembly process, the stator and sensing components of the disk drive motor are in aligned position on printed circuit board 17. The retaining pins associated with the stator windings 24A, sensing device 32, and sensing device 34 extend slightly from the under side of printed circuit board 17. The electrical components are then integrated into the printed circuit board by well known wave soldering techniques. Soldering of these components into the printed circuit board not only electrically connects these components to the printed circuit but also serves to mechanically hold the components onto the printed circuit board. The preferred technique of wave soldering is described extensively in chapter 15 of the second edition of "Printed Circuit Handbook" edited by Clive F. Coombs, Jr., which is incorporated herein by reference. It will be appreciated by those skilled in the art that assembly of the stator up to this point has taken place without the need for interaction with the disk drive unit itself, and that the printed circuit board including the stator and sensing components of the disk drive motor can be prefabricated. It will also be appreciated that the time needed to align the various sensing devices with the the disk drive motor is drastically reduced since alignment is simply achieved by placing each sensing device in its respective receptacle in stator-spacer 25.

When the stator and the sensing devices are mounted to printed circuit board 17 as described above, the printed circuit board is then mounted by conventional means to disk drive chassis 11. Printed circuit board 17 is mounted such that drive shaft 22 passes coaxially through and is rotatably contained within the central aperture located in stator-spacer 25. In order to insure this coaxiality, the beveled upper portion of aperture 23A in the stator spacer is provided. As discussed, the reduced diameter section 22B of the drive shaft housing 22A will be guided by the beveled aperture so as to be coaxial therewith. Since the drive shaft 22 is mounted coaxially with respect to its housing 22A, stator 24 will be coaxial with respect to the drive shaft. In addition, the ledge between reduced diameter section 22B and the main portion of housing 22A acts as a datum surface to insure proper axial alignment of flange 40 and stator 24 when the motor is assembled. In this way, drive shaft 22 is then coaxial with stator 24 and stator windings 24A, and flange 40 is properly spaced with respect to the stator. Rotor-bell 16 is then mounted to flange 40 by rotor bell hold down screws 21 such that rotor-bell 16 is coaxial with drive shaft 22. Since the flange is coaxial with the stator and properly spaced therefrom, rotor bell 16 is properly aligned to the stator when mounted to the flange. Field magnets 36A are arcuately disposed on the inside face of flange portion 16A of rotor bell 16. The exact disposition, extent, materials of construction, and all other pertinent features of magnets 36A are consistent with principles well known in the art for inducing rotation of rotor-bell 16 upon passage of an electrical current through stator windings 24A. Commutator magnets 36B may also arcuately disposed on the inside face of flange portion 16A of rotor-bell 16. The exact disposition, extent, materials of construction, and all other pertinent features of commutator magnets 35B are also consistent with the principals well known in the art for allowing sensors 32 to detect the rotational movement of rotor-bell 16. The location of the receptacle which holds sensing device 32 is predetermined according to the requirements well known in the art for sensing the rotational movement of rotor-bell 16. In the more preferred embodiment, commutator magnets are not used and sensing device 32 is "stood-up" in its receptacle so as to be located between the stator windings, as is known in the art. The location of the receptacle which holds sensing device 34 is also predetermined according to the requirements for sensing the angular position of rotor bell 16. In a preferred embodiment of this invention, sensing device 34 is an optical reflective sensor comprising a light emitting diode (LED) and an emitter detector such as a light sensitive photo-diode. In this preferred embodiment, the exterior of flange portion 16A of rotor-bell 16 contains an optically distinctive characteristic at a predetermined angular position. For example, the exterior of flange portion 16A is plated with a reflective material such as nickel but has an angular section thereof covered by a light absorbing material such as black tape. As rotor-bell 16 rotates, the light sensitive photo-diode will detect the reflection of the LED off the rotor bell at all angular positions except that in which the black tape is adjacent to the LED. In this way, sensing device 34 is able to sense the relative angular position of rotor-bell 16 by sensing the position of the black tape. This aspect of the invention is especially useful in conjunction with the invention disclosed in Ser. No. 854,333 filed Apr. 21, 1986 for locating drive spindle 28 in a particular angular position relative to disk drive chassis 11.

It is apparent from the above recited description that this invention eliminates the need for electrical cables and harnesses running from the disk drive power source to the motor stator and from the motor stator to the various motor control devices. It is also apparent that this invention provides an assembly method which is quicker and more efficient than those heretofore known. As a result, a disk drive made according to the teachings of this invention has the advantages of lower production cost and reduced assembly times.

While a particular embodiment of the invention has been shown and described, modifications are within the spirit and scope of this invention. In particular, it should be understood that this invention applies to disk drive motor systems in general and is not limited to the specific motor configuration described herein. The appended claims, therefore, cover all such modifications.

We claim:

1. A magnetic disk drive comprising:
    (a) a chassis;
    (b) a drive spindle rotatably supported by said chassis for driving the magnetic disk;
    (c) a drive shaft rotatably engaging said spindle;
    (d) a stator having a plurality of stator windings and a central aperture disposed about said drive shaft;
    (e) a printed circuit board supporting said stator disposed between said chassis and said stator, said printed circuit board having a printed circuit thereon and an aperture through which said drive shaft passes;
    (f) a bell rotor mounted to the drive shaft and inductively disposed about said stator;

(g) a first sensing device for sensing the rotation of said bell rotor;

(h) a stator spacer supported by said printed circuit board for aligning said first sensor with said bell rotor and said stator with said drive shaft, said stator spacer including a cylindrical member about which said stator is alignedly disposed, said cylindrical member having a bore through which said drive shaft rotatably passes, and a fan shaped portion integral with and extending radially out from said cylindrical member, said fan shaped portion having a first receptacle therein for retaining said first sensing device; and (i) a retaining pin for fixedly holding and electrically connecting said motor stator to said printed circuit board.

2. The disk drive of claim 1 wherein said retaining pin comprises an electrically conductive nail shape retaining pin.

3. The disk drive of claim 2 wherein said retaining pin is in electrical contact with said stator windings and said printed circuit of said printed circuit board.

4. The disk drive of claim 1 wherein said printed circuit board is disposed between said stator and said spindle.

5. The disk drive of claim 1 wherein said retaining pin includes a first portion holdably engaging said stator and conductively contacting said stator windings and a second portion fixed to said printed circuit board to conductively contacting the printed circuit of said printed circuit board.

6. The disk drive of claim 1 further comprising a second sensing device for sensing the movement of said bell rotor and wherein said fan shaped portion includes a second receptacle for retaining said second sensing device.

7. The disk drive of claim 6 wherein said stator spacer provides coaxiallity between said drive shaft and said central stator aperture.

8. The disk drive of claim 7 wherein said first sensing device is an optical reflective sensor.

* * * * *